(12) United States Patent
Eigle et al.

(10) Patent No.: US 8,588,416 B2
(45) Date of Patent: Nov. 19, 2013

(54) SYSTEM AND METHOD FOR SECURE COMMUNICATION

(75) Inventors: Ted Eigle, Upland, CA (US); Eric J. Andrews, Redondo Beach, CA (US); Ceilidh Hoffmann, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/349,543

(22) Filed: Jan. 12, 2012

(65) Prior Publication Data

US 2013/0185556 A1  Jul. 18, 2013

(51) Int. Cl.
*H04K 1/00* (2006.01)
*H04L 9/00* (2006.01)

(52) U.S. Cl.
USPC .............................. 380/255; 380/258; 380/46

(58) Field of Classification Search
USPC .......................... 380/255, 257–258, 270, 46;
713/160–162, 168–171, 189; 726/2–4
See application file for complete search history.

(56) References Cited

U.S. PATENT DOCUMENTS

| | | | | |
|---|---|---|---|---|
| 7,106,717 | B2 * | 9/2006 | Rousseau et al. | 370/338 |
| 7,975,150 | B1 * | 7/2011 | Lillibridge et al. | 713/193 |
| 2004/0068647 | A1 | 4/2004 | Hariharan et al. | |
| 2010/0088511 | A1 | 4/2010 | Tavernier et al. | |
| 2010/0098249 | A1 | 4/2010 | Shin et al. | |
| 2011/0235627 | A1 * | 9/2011 | Wang | 370/338 |

FOREIGN PATENT DOCUMENTS

CN  101466144 A  6/2009

OTHER PUBLICATIONS

Hsien-Chou Liao, Yun-Hsiang Chao, Chia-Yi Hsu: "A Novel Approach for Data Encyrpting Depending on User Location" The Tenth Pacific Asia Conference on Information Systems (PACIS 2006) Jul. 22, 2006, pp. 470-481.
Elmasry G F et al.: "Partitioned QOS Solution for Tactical Networks—Addressing the Existence of Encryption", Military Communications Conference (MILCOM) 2005, IEEE, Atlantic City, NJ, USA Oct. 17-20, 2005.
PCT/US2012/069588 Internationai Search Report and Written Opinion of the International Searching Authority Apr. 4, 2013.

* cited by examiner

*Primary Examiner* — Hosuk Song
(74) *Attorney, Agent, or Firm* — Ameh IP; Lowell Campbell; Elahe Toosi

(57) ABSTRACT

A system and methods for secure communication are disclosed. A network packet comprising encrypted network address comprising an unencrypted network address encrypted by a first GPS time and a first pseudo random number is received. The encrypted network address is decrypted using the first GPS time and the first pseudo random number to provide the unencrypted network address. The network packet is transmitted based on the unencrypted network address.

17 Claims, 4 Drawing Sheets

SYSTEM AND METHOD FOR SECURE COMMUNICATION

FIELD

Embodiments of the present disclosure relate generally to communication systems. More particularly, embodiments of the present disclosure relate to encrypted communication systems for secure communication.

BACKGROUND

In general commercial wireless networks do not encrypt and protect user information data that is transmitted over the air. Data security and integrity are expected to be handled by an end-user application. Most end-user applications that traverse via the Internet Protocol (IP) network rely on public key encryption methods for both end-user authentication and data security.

With ubiquity of wireless local area networks in public spaces, commercial wireless industry standards bodies have implemented an additional layer of security that serves as gatekeeping to grant access to only authorized users; i.e., users who have a correct network encryption-decryption key. An over-the-air transmitted radio frequency (RF) signal, however, is not protected from eavesdroppers. In contrast, most military wireless networks support both end-user data security as well as protection of over-the-air transmitted RF signal. However, such networks are closed and proprietary and generally cannot interoperate with commercially available wireless devices such as cellular phones, personal computers and tablets.

SUMMARY

A system and methods for secure communication using modified commercial equipment are disclosed. A network packet comprising an encrypted network address for transmission security comprising an unencrypted network address encrypted by a first Global Positioning System (GPS) time and a first pseudo random number is received. The encrypted network address is decrypted using the first GPS time and the first pseudo random number to provide the unencrypted network address. The network packet is transmitted based on the unencrypted network address. In this manner, embodiments of the disclosure make use of low cost high bandwidth commercial-off-the-shelf (COTS) networks to transmit classified data.

In an embodiment, a method for secure communication receives a network packet comprising an encrypted network address comprising an unencrypted network address encrypted by a first GPS time and a first pseudo random number. The method further decrypts the encrypted network address using the first GPS time and the first pseudo random number to provide the unencrypted network address. The method further transmits the network packet based on the unencrypted network address.

In another embodiment, a system for secure communication comprises a receiver module, a decryption module, and a transmitter module. The receiver module is operable to receive a network packet comprising an encrypted network address comprising an unencrypted network address encrypted by a first GPS time and a first pseudo random number. The decryption module is operable to decrypt the encrypted network address to provide an unencrypted network address. The transmitter module is operable to transmit the network packet based on the unencrypted network address.

In a further embodiment, a computer readable storage medium comprises computer-executable instructions for performing a method for secure communication. The method executed by the computer-executable instructions receives a network packet comprising an encrypted network address comprising an unencrypted network address encrypted by a first GPS time and a first pseudo random number. The method further decrypts the encrypted network address using the first GPS time and the first pseudo random number to provide the unencrypted network address. The method further transmits the network packet based on the unencrypted network address.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
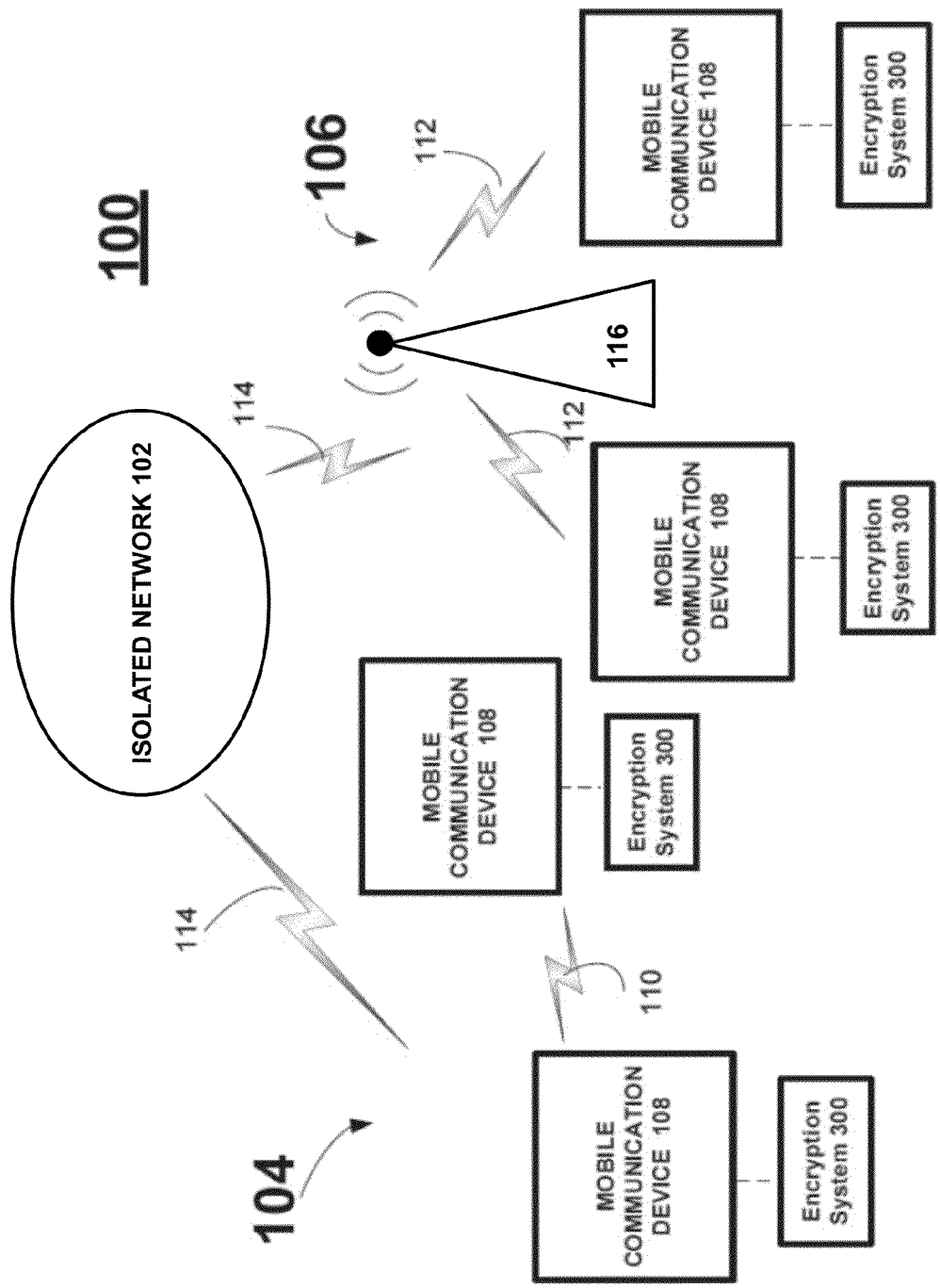
FIG. 1 is an illustration of an exemplary wireless communication environment for transmitting and receiving secure information according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to standard communication systems, military communication systems, network protocols, and other functional aspects of the systems (and the individual operating components of the systems) may not be described in detail herein.

Embodiments of the disclosure are described herein in the context of a practical non-limiting application, namely, a secure communication for a mobile phone application. Embodiments of the disclosure, however, are not limited to such mobile phone applications, and the techniques described herein may also be utilized in other applications. For example, embodiments may be applicable to a desktop computer, a laptop or notebook computer, a Droid™ phone, an iPhone™, a mainframe, a server, a client, or any other type of special or general purpose internally or externally GPS enabled computing device as may be desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

With proliferation of inexpensive commercial-off-the-shelf (COTS) wireless devices (due to economies of scale) and rapid technology advancements in commercial wireless standards, it is desirable to modify both COTS wireless devices and their associated network design such that in tandem military-grade security is offered for both end-user data as well as over-the-air RF signals.

Embodiments of disclosure allow any closed commercial network to be used for secure and classified high bandwidth communication, linking commercial networks with any isolated network such as network for communicating with: drones, aircraft, ground force hand held radios, or other secure network.

FIG. 1 is an illustration of an exemplary wireless communication environment 100 for transmitting and receiving secure information according to an embodiment of the disclosure.

The wireless communication environment 100 comprises an isolated network 102, an ad-hoc network 104, and an infrastructure network 106, a plurality of mobile communication devices 108 each comprising an encryption system 300 for secure communication within the wireless communication environment 100. Each of the isolated network 102, the ad-hoc network 104, and the infrastructure network 106, may comprise, for example but without limitation, an internet protocol network, a circuit-switched network, a packet-switched network, and a wireless communication network.

The mobile communication devices 108 each comprise the encryption system 300 as explained in more detail below in context of discussion of FIG. 3. The encryption system 300 (system 300) comprises a high grade transmission security (TRANSEC) that allows the mobile communication device 108 to communicate with the isolated network 102 at high bandwidth (e.g., 50 Mbps) for data (e.g., maps, voice, video) communication. The encryption system 300 allows any closed commercial network such as the ad-hoc network 104, and the infrastructure network 106, to be used for secure and classified high bandwidth communication via a communication link 114. In this manner, these closed commercial networks can be linked with any isolated network such as the isolated network 102.

The mobile communication devices 108, can communicate:

peer-to-peer in the ad-hoc network 104 via a communication channel 110;

base-to-user in the infrastructure network 106 via a communication channel 112 to a base station 116;

bridge the ad-hoc network 104 that interconnects with an isolated communication network;

bridge the infrastructure network 106 that interconnects with the isolated network 102;

bridge the ad-hoc network 104 that connects with another peer-to-peer or infrastructure mobile network via the isolated network 102 used as a backbone transit network; and bridge the infrastructure network 106 that connects with another peer-to-peer or infrastructure mobile network via an isolated communication network used as a backbone transit network, or other communication channel.

The mobile communication devices 108 may comprise, for example but without limitation, a desktop computer, a laptop or notebook computer, a Droid™ phone, an iPhone™, a mainframe, a server, a client, or any other type of special or general purpose internally or externally GPS enabled computing device as may be desirable or appropriate for a given application or environment.

The isolated network 102 may comprise communication channels configured to support, for example but without limitation, Wideband Networking Waveform (WNW), Enhanced Position Location Reporting System (EPLRS), Soldier Radio Waveform (SRW), Satellite Communications 165 (SATCOM 165), Demand Assigned Multiple Access (DAMA), Mobile User Objective System (MUOS), Single Channel Ground and Airborne Radio System (SINCGARS), or other secure network. The isolated network 102 can be used for communication with, for example but without limitation, drones, aircraft, ground force hand held radios, or other secure device.

The ad-hoc network 104 and the infrastructure network 106 may comprise a closed commercial network comprising communication channels 110/112 configured to support industry standards communication protocols such as, but without limitation, the Third Generation Partnership Project Long Term Evolution (3GPP LTE)™, Third Generation Partnership Project 2 Ultra Mobile Broadband (3 Gpp2 UMB)™, Time Division-Synchronous Code Division Multiple Access (TD-SCDMA)™, and Wireless Interoperability for Microwave Access (WiMAX)™, and other usually used communication protocols. The communication channels 110/112 may also be configured to support alternate, or additional, wireless data communication protocols, including Wi-Fi™, Bluetooth™, and so on.

Figure 2:
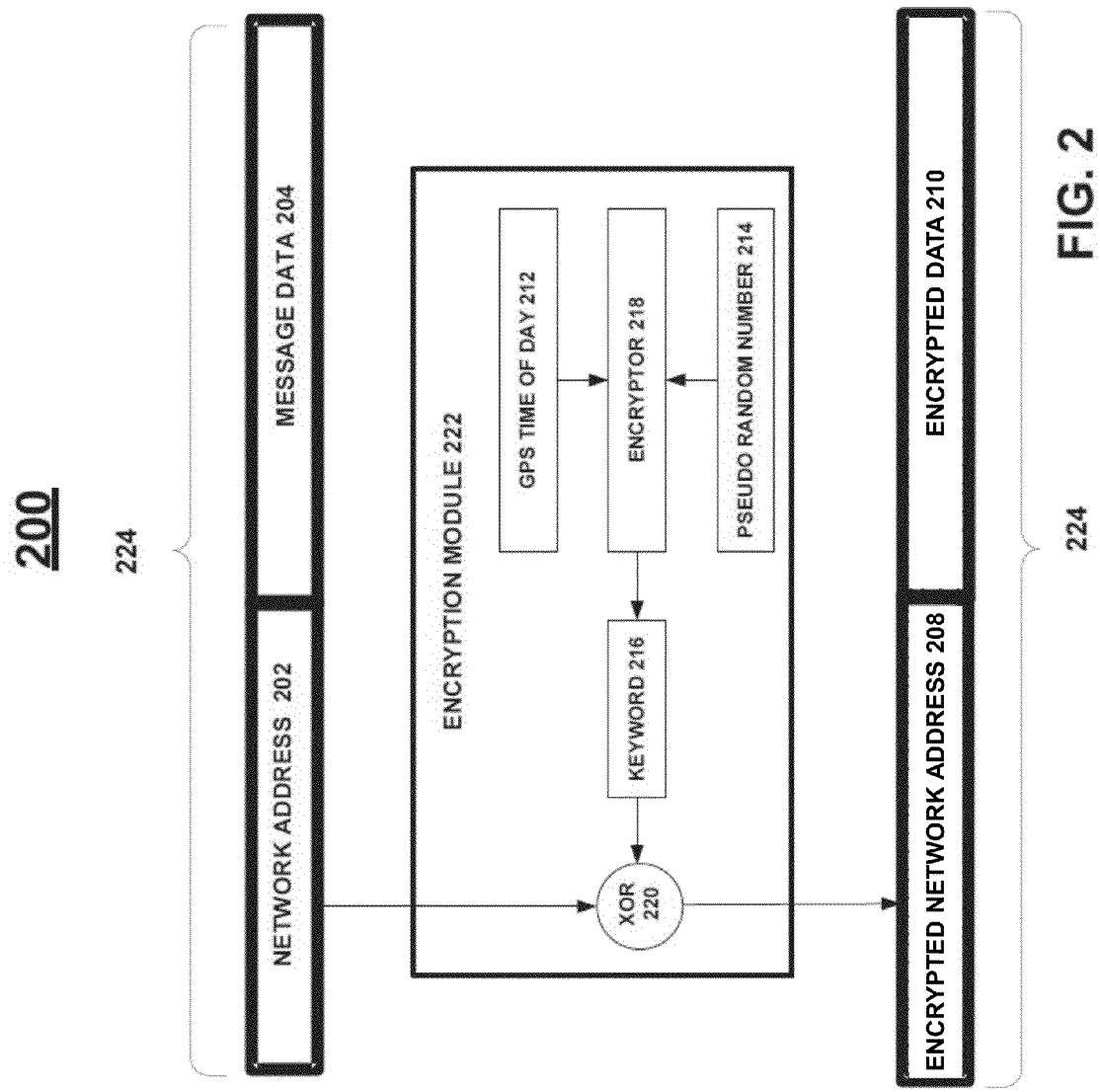
FIG. 2 is an illustration of an exemplary encryption process of a network packet encrypted according to an embodiment of the disclosure.

FIG. 2 is an illustration of an encryption process 200 of a network packet 224 according to an embodiment of the disclosure. The network packet 224 comprises a network address 202 (unencrypted network address 202) and a message data 204. The network address 202 may be encrypted via a Transmission Security (TRANSEC) using a GPS time of day 212 (GPS time 212) and a pseudo random number 214 encryption to provide an encrypted network address 208. The message data 204 may be encrypted via a communication security (COMSEC) encryption to provide an encrypted data 210.

An encryption module 222 receives the GPS time 212, and the pseudo random number 214 at an encryptor 218 therein. The encryptor 218 utilizes the GPS time 212, and the pseudo random number 214 to provide an encryption keyword 216 (keyword 216). The keyword 216 may be exclusive-or'ed by an XOR module 220 with the network address 202 to provide the encrypted network address 208.

The TRANSEC is a component of communications security (COMSEC) that results from application of measures designed to protect transmissions from interception and exploitation by means other than cryptanalysis. Goals of transmission security comprise low probability of interception (LPI), low probability of detection (LPD), Antijam—resistance to jamming, or other characteristic. Embodiments of the disclosure can be used for LPI through use of TRANSEC cover using, for example, a GPS time of day such as the GPS time 212 and a pseudo random number such as the pseudo random number 214 for encryption of the network address 202 for transmission through a closed commercial network such as the ad-hoc network 104, and the infrastructure network 106.

Encryption is a method of converting plaintext into an unreadable an unintelligible format called ciphertext. The process of converting ciphertext back to a recognizable and readable format is called decryption. Using the process of encryption, a user can store or send sensitive information over public networks (e.g., using existing U.S. SIPRNet protocols) in a more secure manner than just sending or storing data in plaintext. When intended viewers of the data wish to access the encrypted data, they use the process of decryption to convert the ciphertext back to a readable format.

Cryptography can be generally defined as the science of using mathematics to encrypt and decrypt data enabling the storage and transmission of sensitive data in a secure manner. A cryptosystem comprises a cryptographic algorithm, or cipher, which is a mathematical function to encrypt and decrypt data and all of the possible keys and protocols that make it work. Using a key, the cryptographic cipher can be used to convert plaintext to and from ciphertext.

Figure 3:
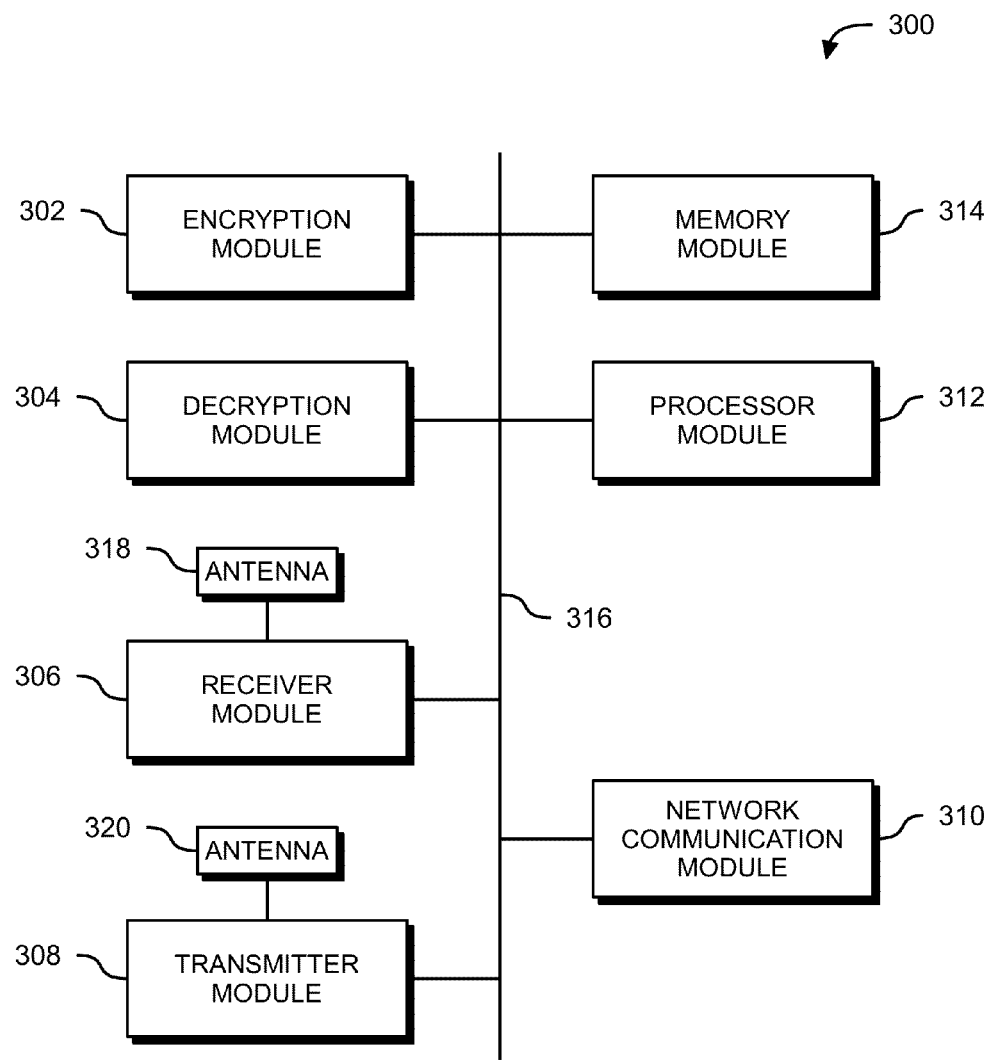
FIG. 3 is an illustration of an exemplary schematic functional block diagram of an encrypted routing system according to an embodiment of the disclosure.

FIG. 3 is an illustration of a schematic functional block diagram of an encrypted routing system 300 (system 300, encryption system 300 in FIG. 1) according to an embodiment of the disclosure. The various illustrative blocks, modules, processing logic, and circuits described in connection with the system 300 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The embodiment shown in FIG. 3 may have functions, material, and structures that are similar to the embodiments shown in FIGS. 1-2. Therefore common features, functions, and elements may not be redundantly described here.

The system 300 may comprise an encryption module 302 (222 in FIG. 2), a decryption module 304, a receiver module 306, a transmitter module 308, a network communication module 310, a processor module 312, and a memory module 314. The system 300 generally comprises a physical housing (not shown).

The illustrated system 300 depicts a simple embodiment for ease of description. These and other elements of the system 300 are interconnected together, allowing communication between the various elements of the system 300. In one embodiment, these and other elements of the system 300 may be interconnected together via a data communication bus 316. The system 300 may be implemented in the mobile communication device 108 as explained above.

The system 300 receives the network packet 224 (FIG. 2) comprising the encrypted network address 208 and the encrypted data 210, decrypts the encrypted network address 208 to provide unencrypted network address, and transmit the network packet 224 based on the unencrypted network address.

The encryption module 302 (222 in FIG. 2) is operable to encrypt the network packet 224 as explained above. Additionally, the encryption module 302 also calculates next stage network address for the network packet through the closed commercial network such as the ad-hoc network 104, and the infrastructure network 106, and encrypts the next stage network address using a second GPS time and a second pseudo random number to provide the encrypted network address 208. In an embodiment, the second GPS time may be the first GPS time and the second pseudo random number may be the first pseudo random number. In other embodiments, the second GPS time may be different from the first GPS time, and the second pseudo random number may be different from the first pseudo random number.

The decryption module 304 is operable to decrypt the encrypted network address 208 (FIG. 2) to provide the unencrypted network address 202. The decryption module 304 receives the network packet 224 from the receiver module 306. The network packet 224 comprises the encrypted network address 208 comprising the unencrypted network address 202 encrypted by the GPS time 212 (FIG. 2) and the pseudo random number 214 (FIG. 2). The decryption module 304 decrypts the encrypted network address 208 using the GPS time 212 and the pseudo random number 214 to provide the unencrypted network address 202. The network packet 224 can then be transmitted based on the unencrypted network address 202 by the transmitter module 308.

The receiver module 306 is operable to receive the network packet 224 via an antenna 318. The network packet 224 comprises the encrypted network address 208 comprising an unencrypted network address encrypted by a first GPS time such as the GPS time 212 and a first pseudo random number such as the pseudo random number 214. The network packet 224 may also comprise an encrypted data such as the encrypted data 210.

The transmitter module 308 is operable to transmit the network packet 224 based on the unencrypted network address 202.

The network communication module 310 is operable to enable the communication channels 110/112/114 for communication between, the ad-hoc network 104, the infrastructure network 106, the isolated network 102, or any other internet protocol network circuit-switched network, and packet-switched network.

The receiver module 306 and the transmitter module 308 are coupled to their respective antenna 318/320. Although in a simple system 300 only one antenna 318 for receiving information and only one antenna 320 for transmitting information may be required, a more sophisticated system 300 may be provided with multiple and/or more complex antenna configurations. Additionally, although not shown in this FIG. 3, those skilled in the art will recognize that a transmitter may transmit to more than one receiver, and that multiple transmitters may transmit to the same receiver.

Processor module 312 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor modules 312 comprise processing logic that is configured to carry out the functions, techniques, and processing tasks associated with the operation of the system 300.

In particular, the processing logic is configured to support the secure communication method of the system 300. For example, the processor module 312 may be suitably configured to direct the system 300 to encrypt the unencrypted network address 202 by the first GPS time 212 and the first pseudo random number 214 to provide the encrypted network address 208, and transmit the network packet 224 based on the unencrypted network address 202. For another example, the processor module 312 may be suitably configured to direct the system 300 to decrypt the encrypted network address 208 by the first GPS time 212 and the first pseudo random number 214 to provide the unencrypted network address 202, and transmit the network packet 224 based on the unencrypted network address 202.

Furthermore, the steps of a method or algorithm described in connection with the embodiments disclosed herein may be embodied directly in hardware, in firmware, in a software module executed by processor module 312, or in any practical combination thereof.

The memory module 314, may be realized as a non-volatile storage device (non-volatile semiconductor memory, hard disk device, optical disk device, and the like), a random access storage device (for example, SRAM, DRAM), or any other form of storage medium known in the art. The memory module 314 may be coupled to the processor module 312 respectively such that the processor module 312 can read information from and write information to memory module 314.

As an example, the processor module 312 and memory module 314, may reside in their respective ASICs. The memory module 314 may also be integrated into the processor modules 312 respectively. In an embodiment, the memory module 314 may include a cache memory for storing temporary variables or other intermediate information during execution of instructions to be executed by processor module 312. The memory module 314 may also include non-volatile memory for storing instructions to be executed by the processor module 312.

The memory module 314 may include a database (not shown) for storing the network packet 224 in accordance with an embodiment of the disclosure. The database may be configured to store, maintain, and provide data as needed to support the functionality of the system 300 in the manner described below. Moreover, the database may be a local database coupled to the processor module 312, or may be a remote database, for example, a central network database, and the like. The database may include a lookup table for purposes of storing the encryption information. The memory module 314 may also store, a computer program that is executed by the processor module 312, an operating system, an application program, tentative data used in executing a program processing, or other application.

Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 4:
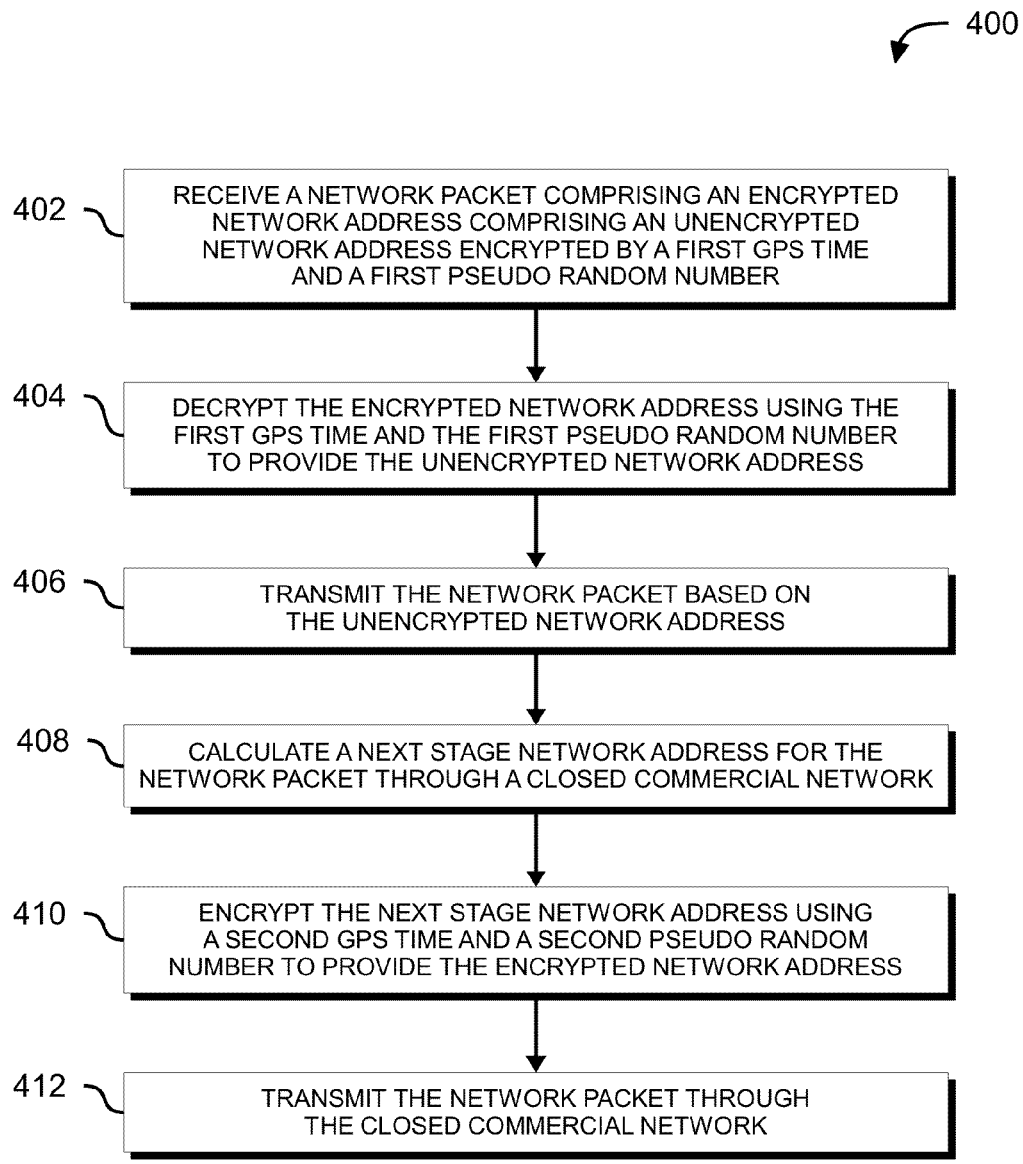
FIG. 4 is an illustration of an exemplary flowchart showing a process for secure communication according to an embodiment of the disclosure.

FIG. 4 is an illustration of an exemplary flowchart showing a process 400 for secure communication according to an embodiment of the disclosure. The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as the processor module 312 in which the computer-readable medium is stored.

It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. In practical embodiments, portions of the process 400 may be performed by different elements of the environment 100, the network packet 224, and the system 300 such as: the mobile communication device 108, the encryption module 302, the decryption module 304, the receiver module 306, the transmitter module 308, the network communication module 310, the processor module 312, the memory module 314, etc. Process 400 may have functions, material, and structures that are similar to the embodiments shown in FIGS. 1-3. Therefore common features, functions, and elements may not be redundantly described here.

Process 400 may begin by receiving a network packet such as the network packet 224 comprising an encrypted network address such as the encrypted network address 208 comprising an unencrypted network address such as the unencrypted network address 202 encrypted by a first GPS time and a first pseudo random number such as the first GPS time 212 and the first pseudo random number 214 respectively (task 402).

Process 400 may continue by decrypting the encrypted network address 208 using the first GPS time 212 and the first pseudo random number 214 to provide the unencrypted network address 202 (task 404).

Process 400 may continue by transmitting the network packet 224 based on the unencrypted network address 202 (task 406).

Process 400 may continue by calculating a next stage network address for the network packet through a closed commercial network such as the ad-hoc network 104 and the infrastructure network 106 (task 408).

Process 400 may continue by encrypting the next stage network address using a second GPS time and a second pseudo random number to provide the encrypted network address 208 (task 410). As mentioned above, in an embodiment, the second GPS time may be the first GPS time 212 and the second pseudo random number may be the first pseudo random number 214. In other embodiments, the second GPS time may be different from the first GPS time 212, and the second pseudo random number may be different from the first pseudo random number 214.

Process 400 may continue by transmitting the network packet 224 through the closed commercial network (task 412).

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor modules 312 to cause the processor modules 312 to perform specified operations. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for secure communication, the method comprising:
   receiving by action of a processor a network packet comprising an encrypted network address comprising an unencrypted network address encrypted by a first GPS time and a first pseudo random number;
   decrypting by action of the processor the encrypted network address using the first GPS time and the first pseudo random number to provide the unencrypted network address;
   transmitting by action of the processor the network packet based on the unencrypted network address;
   calculating by action of the processor a next stage network address for the network packet through a closed commercial network; and
   encrypting by action of the processor the next stage network address using a second GPS time and a second pseudo random number to provide the encrypted network address.

2. The method of claim 1, further comprising transmitting by an action of the processor the network packet through a closed commercial network.

3. The method of claim 2, wherein the closed commercial network comprises at least one of: an internet protocol network, a circuit-switched network, a packet-switched network, and a wireless communication network.

4. The method of claim 1, wherein the second GPS time is the first GPS time, and the second pseudo random number is the first pseudo random number.

5. The method of claim 1, wherein the second GPS time is different from the first GPS time, and the second pseudo random number is different from the first pseudo random number.

6. The method of claim 1, wherein the network packet further comprises encrypted data.

7. A system for secure communication, the system comprising:

a processor;

a receiver module operable to receive a network packet comprising an encrypted network address comprising an unencrypted network address encrypted by a first GPS time and a first pseudo random number;

a decryption module operable to decrypt by action of the processor the encrypted network address to provide the unencrypted network address;

a transmitter module operable to transmit the network packet based on the unencrypted network address; and an encryption module operable to:
calculate by action of the processor a next stage network address for the network packet through a closed commercial network; and
encrypt by action of the processor the next stage network address using a second GPS time and a second pseudo random number to provide the encrypted network address.

8. The system of claim 7, wherein the system comprises a mobile communication device.

9. The system of claim 7, wherein the transmitter module is further operable to transmit the network packet through a closed commercial network.

10. The system of claim 9, wherein the closed commercial network comprises at least one of: an internet protocol network, a circuit-switched network, a packet-switched network, and a wireless communication network.

11. The system of claim 7, wherein the second GPS time is the first GPS time, and the second pseudo random number is the first pseudo random number.

12. The system of claim 7, wherein the second GPS time is different from the first GPS time, and the second pseudo random number is different from the first pseudo random number.

13. A non-transitory computer readable storage medium comprising computer-executable instructions for performing a method for secure communication, the method executed by the computer-executable instructions comprising:

receiving a network packet comprising an encrypted network address comprising an unencrypted network address encrypted by a first GPS time and a first pseudo random number;

decrypting the encrypted network address using the first GPS time and the first pseudo random number to provide the unencrypted network address;

transmitting the network packet based on the unencrypted network address;

calculating a next stage network address for the network packet through a closed commercial network; and encrypting the next stage network address using a second GPS time and a second pseudo random number to provide the encrypted network address.

14. The non-transitory computer readable storage medium of claim 13, the method executed by the computer-executable instructions further comprising transmitting the network packet through a closed commercial network.

15. The non-transitory computer readable storage medium of claim 14, wherein the closed commercial network comprises at least one of: an internet protocol network, a circuit-switched network, a packet-switched network, and a wireless communication network.

16. The non-transitory computer readable storage medium of claim 13, wherein the second GPS time is the first GPS time, and the second pseudo random number is the first pseudo random number.

17. The non-transitory computer readable storage medium of claim 13, wherein the second GPS time is different from the first GPS time, and the second pseudo random number is different from the first pseudo random number.

* * * * *